Feb. 27, 1951 H. H. HUFFORD 2,543,576
SLED-TYPE FISHING LINE SINKER
Filed Jan. 23, 1950

Inventor
Harold H. Hufford

By *Clarence A. O'Brien
and Harvey B. Jacobson*
Attorneys

Patented Feb. 27, 1951

2,543,576

UNITED STATES PATENT OFFICE 2,543,576

SLED-TYPE FISHING LINE SINKER

Harold H. Hufford, Warren, Ohio, assignor of thirty-three and one-third per cent to Charles Kozup, Warren, Ohio Application January 23, 1950, Serial No. 140,011

2 Claims. (Cl. 43—44.97)

The present invention relates to certain new and useful improvements in especially constructed fishing line sinkers and has more particular reference to a novel sled unit which carries a pendulously mounted lead or equivalent sinker and which causes the line and fishing hooks to come to the surface when the line is being retrieved in order to prevent loss of such hooks by becoming entangled with weeds, rocks, logs and the like.

As the opening statement of the invention implies, it is not new, in the class of sinkers, to attach a sinker to a retrieving sled, or to provide the sinker with wings, fins, or the like to cause same to ride to the surface and to minimize the likelihood of the tackle getting caught on logs and the like. Despite efforts of my predecessors and contemporaries to aptly solve the problem of retrieving tackle in its most intact state, it is believed that the full problem still remains unsolved. It is obvious, therefore, that in carrying out my special aims, I have evolved and produced a novel and practical sinker sled or mount in which users, as well as manufacturers, will find their most essential needs fully met, contained and appropriately available.

Briefly, one phase of the invention has to do with a retrieving sled which is characterized by simple aquaplanes, the sinker being pendulously mounted on the trailing ends of said planes. Then, too, novelty is predicated on the stated sled wherein there are two such planes, the forward and rear portions of which are spaced apart, the sinker being swingably mounted between the spaced rear end portion and there being a novel line eye unit or adapter hingedly mounted on the spaced leading ends.

Other objects and advantages will become more readily apparent from the following description and the accompanying illustrative drawings.

In the accompanying sheet of drawings, wherein like numerals are employed to designate like parts throughout the views.

Figure 1:
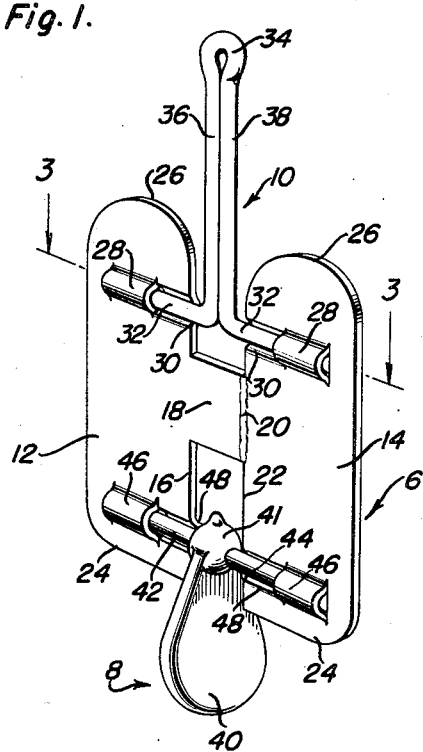
Figure 1 is a perspective view of a sinker-equipped sled constructed in accordance with the principles of the present invention.
Figure 2:
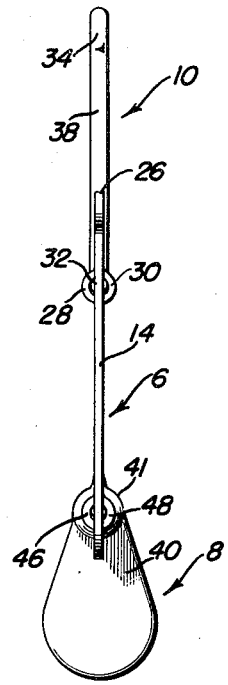
Figure 2 is an edge elevational view of the structure shown in Figure 1.
Figure 3:
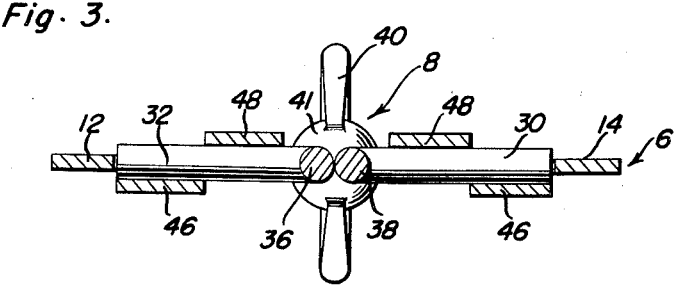
Figure 3 is a horizontal section on an enlarged scale, taken on the section line 3—3 of Figure 1, looking in the direction of the arrows.
Figure 4:
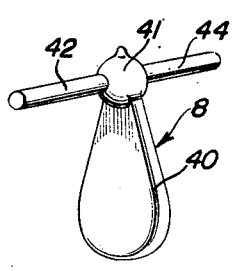
Figure 4 is a perspective view of the sinker per se.

Referring now to the drawings by distinguishing numerals and accompanying lead lines, the overall structure may be said to be broadly characterized by three parts or units; namely, the sled 6, sinker unit 8 and line adapter unit 10.

The sled unit is a simple dual plane structure characterized by duplicate complemental planes 12 and 14, often suitably described, I believe, as surf-type aquaplanes. Each plane is flat and of general rectangular form and the median longitudinal inner edge portion 16 of the plane 12 is provided with a connecting tongue 18 which is welded or otherwise joined as at 20 to the edge 22 of the plane 14. The trailing edge of each plane is straight across, as at 24, and these edges are at right angles to the longitudinal axis of the body portion. The leading or fronting ends are rounded and substantially semi-circular in form, as shown at 26—26. Thus, the sled 6 is a miniature aquaplane made up of interconnected spaced planes resembling surf-boards. The leading end portions have transverse bends 28 and 30 which conjointly provide satisfactory bearings for laterally bent journals 32—32 on the fishing line adapter 10. This is a swingably mounted member which is fashioned from a single length of wire bent upon itself to form an eye 34 and opposed limbs 36 and 38 which are fashioned at their free ends into the aforementioned lateral journals 32—32. The limbs swing freely between the spaced forward end portions of the planes 12 and 14. The eye extends beyond the leading edges or ends 26—26 to promote convenience of connection with the fishing line (not shown).

The sinker unit 8 is of lead or appropriate weighty material and the sinker proper is lobe-shaped as at 40 and has a ball member whereby it is appropriately joined to a rocker shaft having its end portions or journals 42 and 44 rockably mounted in the bearings provided by the complemental bends 46 and 48 in the trailing ends of the planes 12 and 14.

In practice, it is obvious that the twin plane sled is swingably hitched or harnessed to the fishing line by the self-adapting adapter 10, that the sinker is freely swingable, in pendulous fashion, on the trailing end of the sled. Portions of the adapter and sinker operate in the space existing between the inner longitudinal edge portions 18 and 22 of the planes 12 and 14.

In view of the foregoing description taken in conjunction with the accompanying drawings, it is believed that a clear understanding of the device will be quite apparent to those skilled in this art. A more detailed description is accordingly deemed unnecessary.

It is to be understood, however, that even though there is herein shown and described a preferred embodiment of the invention, the same is susceptible to certain changes fully comprehended by the spirit of the invention as herein described and within the scope of the appended claims.

Having described the invention, what is claimed as new is:

1. A device of the class described comprising a sled embodying a pair of duplicate spaced parallel rectangular plates defining complemental surf-planes, a line adapter hingedly mounted on the leading end portion of said sled, and a sinker pendulously mounted on the trailing end portion of said sled, said sinker having a rocker shaft and said planes having bearings in which end portions of said rocker shaft are journaled.

2. A sinker of the class shown and described comprising a pair of coplanar substantially flat rectangular plates arranged in spaced parallelism and having edge portions joined together, said plates providing sledding planes, the rear trailing transverse end portions of said plates being provided with bearings, a rocker shaft journaled for rotation in said bearings, a sinker on the intermediate portion of the rocker shaft operable in the space adjacent rear end portions of said plates, the forward ends of the plates having bearings, and a line attaching device having journals operable in the last-named bearings.

HAROLD H. HUFFORD.

REFERENCES CITED

The following references are of record in the file of this patent:

UNITED STATES PATENTS

| Number | Name | Date |
| --- | --- | --- |
| 2,473,644 | Groza | June 21, 1949 |